Patented Jan. 2, 1940

2,185,405

UNITED STATES PATENT OFFICE 2,185,405

CONVERSION OF OLEFINS INTO VALUABLE HIGHER MOLECULAR PRODUCTS

Walter Flemming, Ludwigshafen-on-the-Rhine, and Wilhelm Baumeister, Heidelberg, Germany, assignors to I. G. Farbenindustrie Aktiengesellschaft, Frankfort-on-the-Main, Germany No Drawing. Application June 8, 1938, Serial No. 212,502. In Germany June 9, 1937

3 Claims. (Cl. 196—10)

The present invention relates to the conversion of olefins into valuable higher molecular products, in particular into hydrocarbon oils boiling higher than benzine, such as middle oils, heavy oils and lubricating oils, by polymerization.

In our copending application Ser. 129,386, filed March 6, 1937, we have described a process according to which olefins are subjected to polymerization in the presence of a halide of aluminum, preferably aluminum chloride, as polymerization catalyst and of a halogen hydrocarbon as dispersion agent.

We have now found that in the said reaction it is very advantageous to use as halogen hydrocarbons those having multiple carbon linkages, especially those having a double carbon linkage, in particular unsaturated chlorine hydrocarbons, without the latter taking part in the reaction in an undesirable manner. Thus for example perchlorethylene, which very readily adds on bromine, acts in the reaction as a saturated chlorohydrocarbon as do di- and tri-chlorethylene.

Perchlorethylene has the advantage for carrying out the process in practice that it has about one-fifth of the vapor pressure of carbon tetrachloride and the waste of dispersion agent, especially when working with flowing gases, is therefore very small. Like di- and tri-chlorethylene, it is also less poisonous than the saturated tetrachlorethane which has a similar vapor pressure to perchlorethylene.

The other working conditions for carrying out the polymerization with the said halogen hydrocarbons having multiple carbon linkages as dispersion agents are substantially the same as those described in the specification of the said copending application Ser. No. 129,386.

The following example will further illustrate the nature of this invention but the invention is not restricted to this example.

Example 150 grams of a raw anhydrous aluminum chloride and 8000 grams of perchlorethylene are charged into a cylindrical iron reaction vessel. 3 molecular proportions per hour of propylene are then led in and the temperature inside the vessel is kept at from 0° to 20° C. by external cooling.

The absorption of gas is completed after 15 hours.

The solution of the propylene polymerization product is diluted with the same amount of perchlorethylene, washed twice with water and then subjected to distillation for the removal of the perchlorethylene. The distillation residue consists of 1790 grams of a pale polymerization product which has a viscosity of 22° Engler at 99° C.

What we claim is:

1. A process for the conversion of gaseous olefins into valuable liquid hydrocarbon products which comprises subjecting them to polymerization in the presence of an anhydrous halide of aluminum as a polymerization catalyst and of a halogen hydrocarbon having a double carbon linkage as dispersion agent.

2. In the process as claimed in claim 1, operating in the presence, as dispersion agent, of a chlorine hydrocarbon having a double carbon linkage.

3. In the process as claimed in claim 1, operating in the presence, as dispersion agent, of perchlorethylene.

WALTER FLEMMING.
WILHELM BAUMEISTER.